United States Patent
Kao et al.

(10) Patent No.: US 9,471,180 B2
(45) Date of Patent: Oct. 18, 2016

(54) OPTICAL TOUCH PANEL SYSTEM, OPTICAL APPARATUS AND POSITIONING METHOD THEREOF

(71) Applicants: Ming-Tsan Kao, Hsin-Chu (TW); Chi-Chieh Liao, Hsin-Chu (TW); Chih-Hsin Lin, Hsin-Chu (TW); Tzung-Min Su, Hsin-Chu (TW)

(72) Inventors: Ming-Tsan Kao, Hsin-Chu (TW); Chi-Chieh Liao, Hsin-Chu (TW); Chih-Hsin Lin, Hsin-Chu (TW); Tzung-Min Su, Hsin-Chu (TW)

(73) Assignee: PIXART IMAGING INCORPORATION, R.O.C., Hsin-Chu (TW)

( * ) Notice: Subject to any disclaimer, the term of this patent is extended or adjusted under 35 U.S.C. 154(b) by 164 days.

(21) Appl. No.: 14/314,455

(22) Filed: Jun. 25, 2014

(65) Prior Publication Data

US 2014/0306934 A1    Oct. 16, 2014

Related U.S. Application Data

(62) Division of application No. 13/525,258, filed on Jun. 15, 2012, now abandoned.

(51) Int. Cl.
G06F 3/042    (2006.01)
G06F 3/041    (2006.01)

(52) U.S. Cl.
CPC ............. G06F 3/042 (2013.01); G06F 3/0416 (2013.01); G06F 3/0428 (2013.01)

(58) Field of Classification Search
CPC ..... G06F 3/042; G06F 3/0416; G06F 3/0428
See application file for complete search history.

(56) References Cited

U.S. PATENT DOCUMENTS

| 4,782,328 A * | 11/1988 | Denlinger | G01S 5/16 250/221 |
|---|---|---|---|
| 5,484,966 A * | 1/1996 | Segen | G06F 3/0428 178/18.09 |
| 2010/0214268 A1* | 8/2010 | Huang | G06F 3/0421 345/175 |
| 2010/0295821 A1* | 11/2010 | Chang | G06F 3/0421 345/175 |
| 2011/0061950 A1* | 3/2011 | Cheng | G06F 3/0428 178/18.09 |

* cited by examiner

*Primary Examiner* — Andrew Sasinowski
*Assistant Examiner* — Brent D Castiaux
(74) *Attorney, Agent, or Firm* — Tung & Associates

(57) ABSTRACT

The present invention discloses an optical touch panel system and a positioning method for positioning an object in a touch control area. The system includes: at least two reflective elements respectively disposed on a first side and a second side of the touch control area, wherein the sum of lengths of the first side and the second side is larger than the sum of lengths of the two reflective elements; two lighting elements respectively disposed on a third side and a fourth side of the touch control area; an image sensor forming projected images by capturing an image of the object and at least one mirror image of the object formed by the two reflective elements; and a processor calculating the coordinates of the object according to geometric information of the projected images.

16 Claims, 8 Drawing Sheets

OPTICAL TOUCH PANEL SYSTEM, OPTICAL APPARATUS AND POSITIONING METHOD THEREOF

CROSS REFERENCE

The present invention claims priority to TW 100131581, filed on Sep. 1, 2011.

This is a Divisional Application of a co-pending application Ser. No. 13/525,258, filed on Jun. 15, 2012.

BACKGROUND OF THE INVENTION

1. Field of Invention

The present invention relates to an optical touch panel system, an optical apparatus and a positioning method thereof, in particular to such optical touch panel system and positioning method which utilize plural reflective elements to resolve the problem of blind zones.

2. Description of Related Art

Touch screen is an interactive apparatus for users to directly and intuitively operate application software on the screen. There are various types of touch screens, one of which is the optical touch panel.

FIG. 1 shows a prior art optical touch panel system 1, which is disclosed by U.S. Pat. No. 4,782,328. As shown in FIG. 1, the optical touch panel system 1 comprises two sensors 11 for capturing images of an object 13 on a touch control area 12. A processor 14 is coupled to the two sensors 11; it analyzes the images generated by the sensors 11 to determine the sensing paths 15 linking the object 13 to the two sensors 11. The processor 14 calculates the coordinate of the object 13 according to the sensing paths 15. Because the optical touch panel system 1 requires two sensors 11, the cost is relatively high.

FIG. 2 shows another prior art optical touch panel system 2 which is disclosed by Taiwanese Patent Publication No. 201003477 (counterpart U.S. Pat. No. 7,689,381 B2). The optical touch panel system 2 comprises a mirror 21, two light sources 22, an image sensor 23 and a processor 24. The mirror 21 and the two light sources 22 are located at the periphery of a touch control area 28. The mirror 21 reflects the object 25 to generate a mirror image 26. The image sensor 23 captures the real image of the object 25 and the mirror image 26. The processor 24 analyzes the sensing paths 27 passing the real image of the object 25 and the mirror image 26, and calculates the coordinate of the object 25 according to the two sensing paths 27. The optical touch panel system 2 only needs one image sensor 23, so the cost is reduced.

In the optical touch panel system 2, when the two sensing paths 27 are too close to each other, the real image of the object 25 and the mirror image 26 overlap with each other, and the position of the object 25 cannot be obtained. As shown in FIG. 2, when the object 25 is in the region of the touch control area 28 near the side where no light source is provided, the precise position of the object cannot be detected because the real image of the object and the mirror image will overlap. This region is called the blind zone.

To resolve the problem of the blind zone, Taiwanese Invention Patent Application No. 098131423 (FIG. 10 of U.S. Patent Publication No. 2010/0309169 also discloses a similar apparatus) provides an optical touch control apparatus, as shown in FIG. 3. The optical touch control apparatus 100a comprises a lighting device 120, an image detection module 130, two light guide bars (112a, 112b), and two stripe-like mirrors (114a, 114b). The light guide bars (112a, 112b) are close to each other, and the stripe-like mirrors (114a, 114b) are close to each other. The light guide bars (112a, 112b) and the stripe-like mirrors (114a, 114b) are disposed around the four sides of a rectangle. The inside area of the rectangle is a sensing area 116. The light guide module 110a includes two stripe-like mirrors (114a, 114b), so each point being touched in the sensing area 116 generates three mirror images. The image detection module 130 captures the real image of the object B and the mirror images B1-B3, and calculates the position of the object B according to these images. The area of the blind zone 150a in the optical touch control apparatus 100a is reduced, but the problem of the blind zone still exists. That is, the dark images of B and B1 partially overlap with each other and the dark images of B2 and B3 partially overlap with each other. In addition, infinite reflection occurs in the neighborhood of the corner between the two stripe-like mirrors (114a, 114b).

In view of above, the present invention overcomes the foregoing drawbacks by providing an optical touch panel system and a positioning method which utilize plural reflective elements to resolve the problem of blind zones. Furthermore, the infinite reflection does not occur.

SUMMARY OF THE INVENTION

An objective of the present invention is to provide an optical touch panel system for resolving the problem of blind zones.

Another objective of the present invention is to provide a positioning method of an optical touch panel system.

To achieve the foregoing objectives, in one aspect, the present invention provides an optical touch panel system, for positioning an object in a touch control area, the system comprising: at least two reflective elements respectively disposed on a first side and a second side of the touch control area, wherein the first side and the second side are adjacent to each other, and wherein the sum of lengths of the first side and the second side is larger than the sum of lengths of the two reflective elements; two lighting elements respectively disposed on a third side and a fourth side of the touch control area, wherein the third side and the fourth side are adjacent to each other; an image sensor capturing an image of the object to form a projected object image and at least one mirror image of the object formed by the two reflective elements to form at least one projected mirror image; and a processor calculating coordinates of the object according to geometric information of at least two of the projected object image and the at least one projected mirror image.

In one embodiment, the geometric information includes centers, gravity centers, representative positions, or borders of the projected object image and the projected mirror image.

In one embodiment, the two reflective elements are adjacent to each other, and the optical touch panel system further comprises two lighting elements respectively disposed on the first side and the second side. The two lighting elements disposed on the first side and the second side are respectively adjacent to the two lighting elements disposed on the third side and the fourth side.

In one embodiment, the reflective element disposed on the first side occupies the whole first side, and the reflective element disposed on the second side occupies a middle portion of the second side. The lighting element disposed on the fourth side occupies a portion of the fourth side, and is adjacent to the reflective element disposed on the first side.

In one embodiment, the processor selects any two of the projected object image and the at least one projected mirror image which are non-overlapping with any other or selects an overlapping image of the projected object image and the at least one projected mirror image according to the total number of the projected object image and the at least one projected mirror image, wherein an overlapping projected image counts one, and calculates the coordinates of the object according to the geometric information of the selected non-overlapping projected images or selected overlapping projected image.

In yet another aspect, the present invention provides a positioning method of an optical touch panel system, wherein an image sensor of the optical touch panel system forms projected images including a projected object image by capturing an image of an object in a touch control area and a plurality of projected mirror images by capturing a plurality of mirror images of the object formed by at least two reflective elements, the method comprising: checking a total number of the projected images, wherein if any two of the projected object image and the projected mirror images overlap with each other, the overlapping projected image counts one; selecting any two of the projected images and obtaining coordinates of the object according to geometric information of the two selected projected images if the number is larger than or equal to 4; selecting two of the projected images which are non-overlapping with any other and obtaining coordinates of the object according to geometric information of the two selected projected images if the number is equal to 3; and selecting the overlapping projected image formed by the projected object image overlapping with one or more projected mirror images and obtaining coordinates of the object according to borders or sides of the overlapping projected image if the number is smaller than 3.

In yet another aspect, the present invention provides an optical touch panel system, for positioning an object in a touch control area, comprising: at least two reflective elements respectively disposed on a first side and a second side of the touch control area, wherein the first side and the second side are adjacent to each other, and wherein an included angle between the two reflective elements is larger than 90°; two lighting elements respectively disposed on a third side and a fourth side of the touch control area, wherein the third side and the fourth side are adjacent to each other; an image sensor capturing an image of the object to form a projected object image and at least one mirror image of the object formed by the at least two reflective elements to form at least one projected mirror image; and a processor calculating the coordinates of the object according to geometric information of at least two of the projected object image and the at least one projected mirror image.

In yet another aspect, the present invention provides an optical apparatus of an optical touch panel system, for positioning an object in a touch control area, the optical apparatus comprising: a first reflective element disposed on a first side of the touch control area; a second reflective element disposed on a second side of the touch control area and occupies a middle portion thereof, wherein the first side and the second side are adjacent to each other; a first lighting element disposed on a third side of the touch control area; a second lighting element disposed on a fourth side of the touch control area and adjacent to the first side, wherein the third side and the fourth side are adjacent to each other; and a third lighting element and a fourth lighting element disposed on the second side, wherein the fourth and third lighting elements are respectively adjacent to the first side and the third side; wherein the second reflective element is between the fourth and third lighting elements.

In yet another aspect, the present invention provides an optical touch panel system for positioning an object in a touch control area, the touch control area including a first side, a second side, a third side, and fourth side adjacent to each other in the listed order, the system comprising: an image sensor disposed at the corner between the third side and the fourth side; a lighting unit disposed on the fourth side and occupies a portion thereof which is adjacent to the first side; and a reflective unit disposed on the second side and occupies a middle portion thereof; wherein the image sensor captures a mirror image formed by the reflective unit reflecting light from the lighting unit.

The objectives, technical details, features, and effects of the present invention will be better understood with regard to the detailed description of the embodiments below, with reference to the drawings.

DESCRIPTION OF THE PREFERRED EMBODIMENTS

Figure 4:
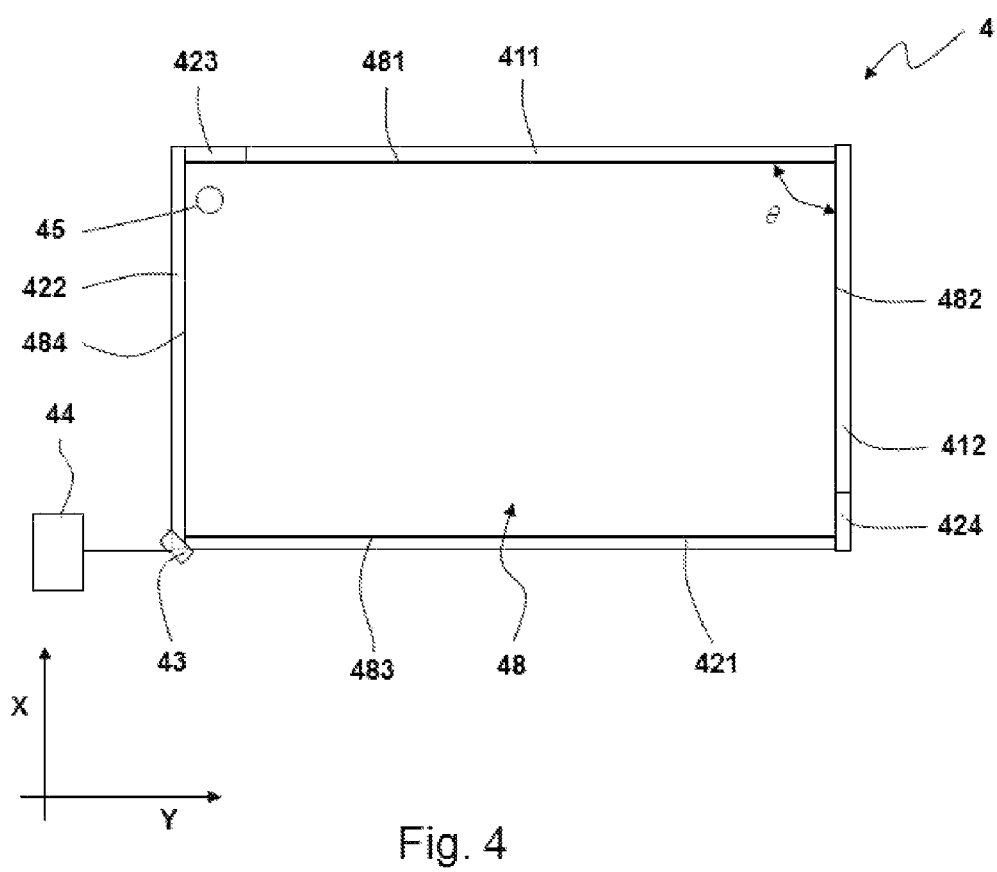
FIG. 4 shows a schematic diagram illustrating an embodiment of an optical touch panel system of the present invention.

FIG. 4 shows a schematic diagram illustrating an embodiment of an optical touch panel system of the present invention. When an object 45 (e.g. a finger or a stylus pen) touches the touch control areas 48 of an optical touch panel system 4, the system is able to calculate the coordinate of the object 45, that is, to position it. The optical touch panel system 4 comprises first and second reflective elements (411 and 412), first to fourth lighting elements (421-424), an image sensor 43 and a processor 44. The first reflective element 411 and the second reflective element 412 are respectively disposed on the first side 481 and the second side 482 of the touch control area 48, wherein the first and second sides 481 and 482 are adjacent to each other. The first and second lighting elements (421 and 422) are respectively disposed on the third side 483 and the fourth side 484 of the touch control area 48, wherein the third and fourth sides 483 and 484 are adjacent to each other. The reflective element 411 and the second reflective element 412 may each be, but not limited to, a plane mirror. The first to fourth lighting elements 421-424 may each be a linear light source capable of emitting invisible light. The image sensor 43 includes an image-sensing window and preferably a filter.

Figure 1:
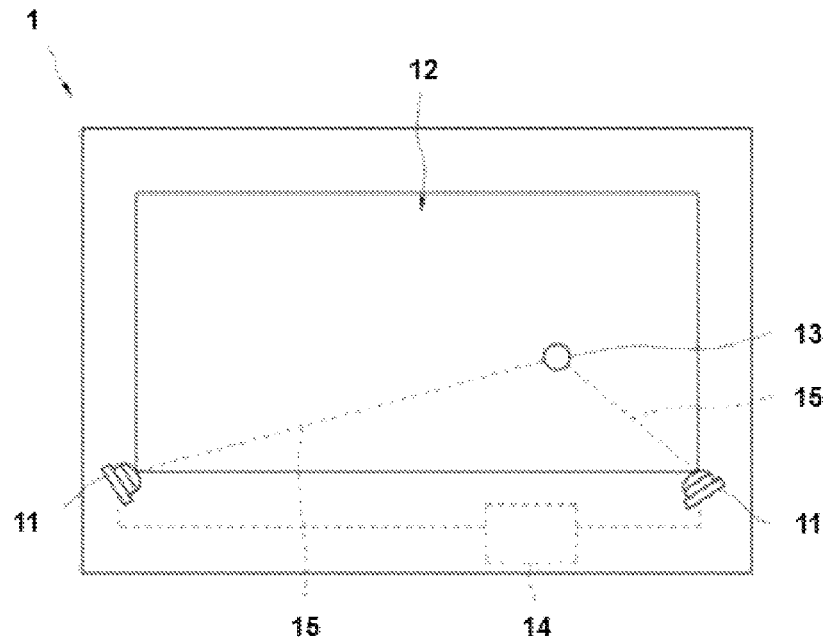
FIG. 1 shows a prior art optical touch panel system.
Figure 2:
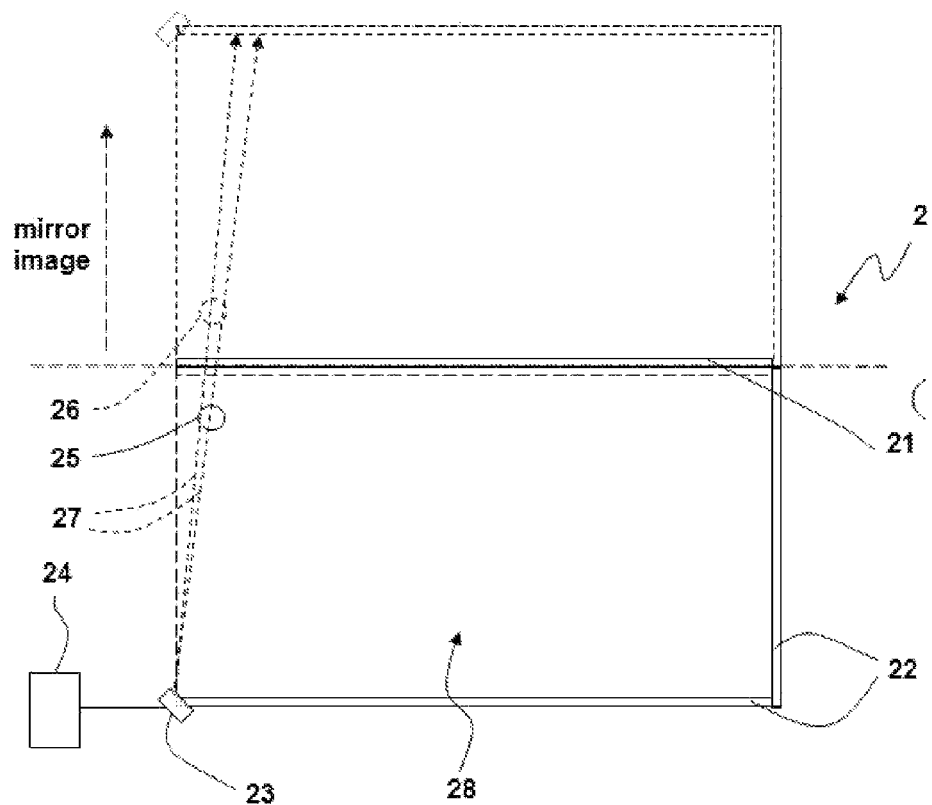
FIG. 2 shows another prior art optical touch panel system.
Figure 3:
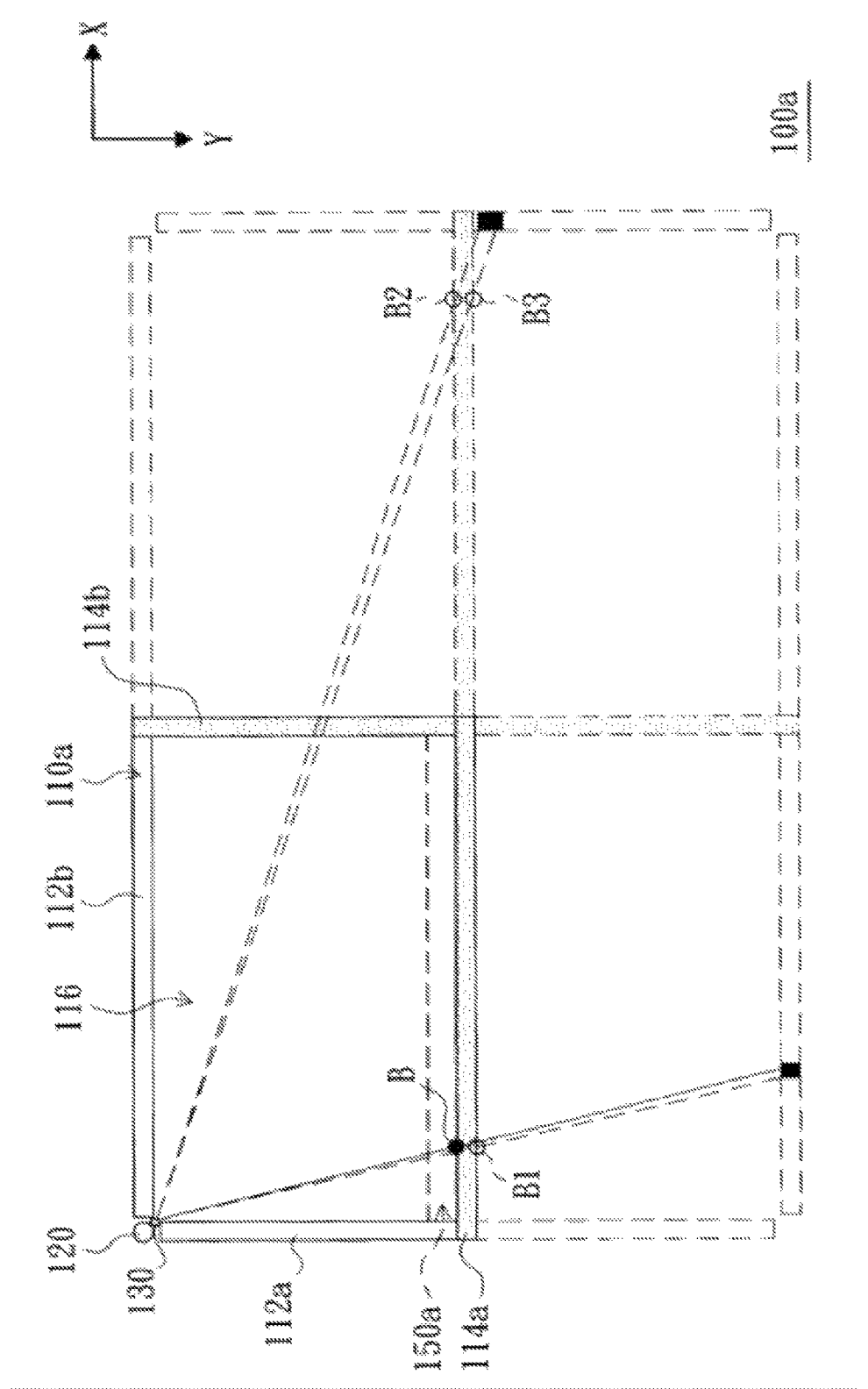
FIG. 3 shows yet another prior art optical touch panel system.

In this embodiment, the third lighting element 423 is disposed between the first reflective element 411 and the second lighting element 422, whereby the image sensor 43 can obtain the sole image of the object 45. This avoids the overlap between the object real image and the mirror image in FIG. 2 and FIG. 3 of the prior art; more details will be described below with reference to FIG. 5. The fourth lighting element 424 is disposed between the second reflective element 412 and the first lighting element 421, whereby similar overlap situations are also avoided when the object 45 is in the neighborhood of the fourth lighting element 424. In addition, the included angle between the first reflective element 411 and the second reflective element 412 may be larger than 90° so as to resolve the problem of the infinite reflection; a preferred range is between 90° (not included) and 96° (included). As shown in FIG. 4, the first reflective element 411 does not cover the whole first side 481, and the second reflective element 412 also does not cover the whole second side 482. That is, the sum of the lengths of the first side 481 and the second side 482 is larger than the sum of the lengths of the two reflective elements (411 and 412). In this embodiment, a non-reflective region is provided adjacent each reflective element, i.e., adjacent the side which is closer to the image sensor, so that the overlap between the real image and the virtual image of the object occurs less often. In the non-reflective region, preferably, a lighting element is disposed to increase the accuracy of recognizing the real image.

Figure 5:
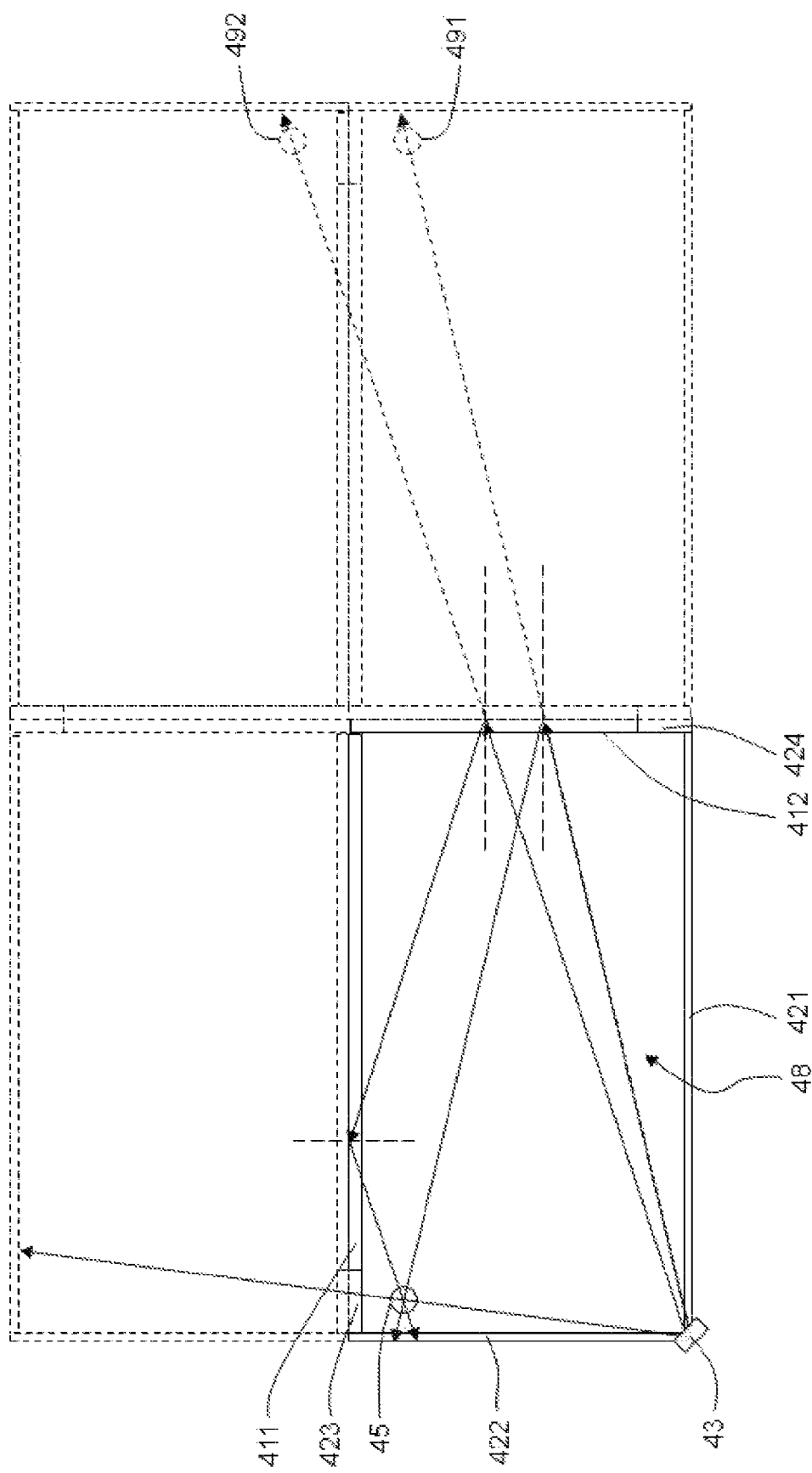
FIG. 5 shows that the optical touch panel system of FIG. 4 captures a picture through the sensing paths passing the object.
Figure 6:
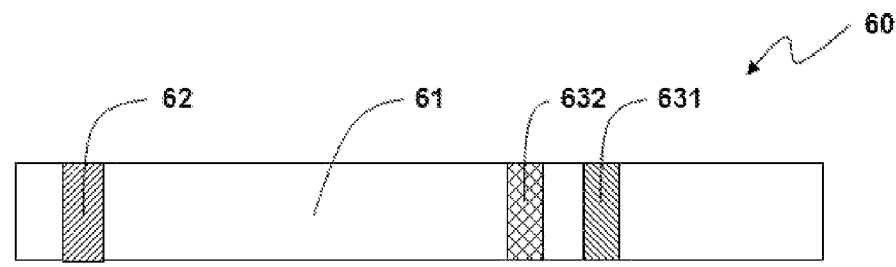
FIG. 6 shows a schematic diagram of the image-sensing window of the image sensor in FIG. 5.

FIG. 5 shows that the optical touch panel system of FIG. 4 captures a picture through the sensing paths passing the object. FIG. 6 shows a schematic diagram of the image-sensing window of the image sensor in FIG. 5. When the object 45 is in or close to the neighborhood of the third lighting element 423, the second lighting element 422 and the third lighting element 423 can emit light to form a bright zone 61 with higher brightness in the image-sensing window 60 captured by the image sensor 43. Because the object 45 shields a portion of light from the third lighting element 423, a narrow and dark object image 62 is formed, as shown in FIG. 6. This sensed object image 62 is also referred to as the optical information of the object, or projected image of the object (projected object image). Compared with FIG. 3 of the prior art, the projected object image 62 obtained in this embodiment is isolated, so the overlap between the mirror image and the real image (i.e., between the projected mirror image and the projected object image which are formed on the picture sensed by the image sensor 43) does not occur. A first mirror image 491 is formed by reflecting the object 45 through the second reflective element 412, and a second mirror image 492 is formed by reflecting the first mirror 491 through the first reflective element 411. A first projected mirror image 631 and a second projected mirror image 632 (or named as the optical information of the first mirror image and the second mirror image) are respectively formed on the image-sensing window 60 by the first mirror image 491 and the second mirror image 492. In this embodiment, the projected object image 62 maybe a shielded image with lower brightness in comparison with the background (bright zone 61) of the image-sensing window 60.

Referring to FIG. 6, the processor 44 can select any two of the optical information of the projected object image 62, the first projected mirror image 631, and the second projected mirror image 632. The coordinates of the object 45 are obtained according to the geometric information such as the centers, gravity centers, or representative positions of the selected optical information. The coordinates can be calculated by any method typically used and well known by a person ordinarily skilled in the art. For more reference, please refer to US 2011/0061950 also filed by the same applicant. Because the second projected mirror image 632 is a mirror image formed by secondary reflection, the light path is long and thus the optical information may be unclear or insufficient; for example, the brightness of the second projected mirror image 632 may be close to its background. In this case, the processor 44 can select the object image 62 and the first projected mirror image 631 for calculating the coordinates of the object 45. And when the object 45 is close to the neighborhood of the fourth lighting element 424, because the present embodiment provides the fourth lighting element 424 instead of a mirror, the image overlapping problem can be resolved.

Figure 7:
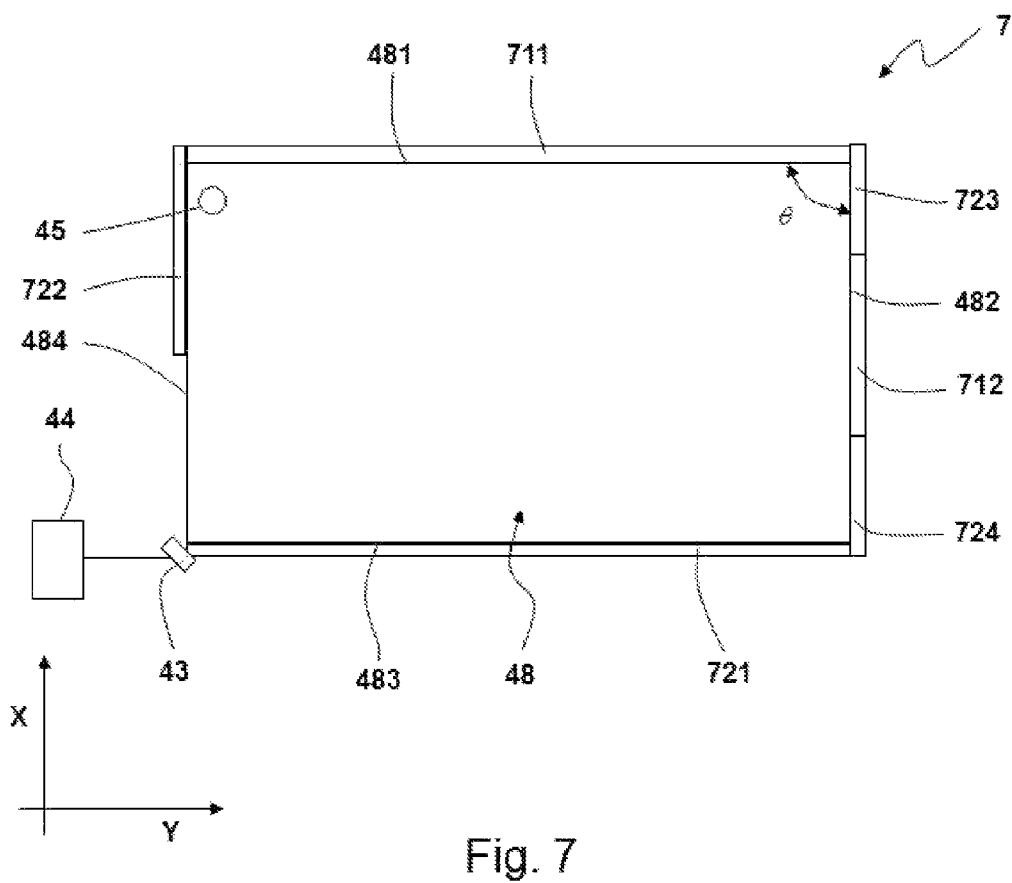
FIG. 7 shows a schematic diagram illustrating another embodiment of an optical touch panel system of the present invention.

FIG. 7 shows a schematic diagram illustrating another embodiment of an optical touch panel system of the present invention. The optical touch panel system 7 comprises first and second reflective elements (711 and 712), first to fourth lighting elements (721-724), an image sensor 43 and a processor 44. The first reflective element 711 and the second reflective element 712 are respectively disposed on the first side 481 and the second side 482 of the touch control area 48, wherein the first and second sides 481 and 482 are adjacent to each other. The first and second lighting elements (721 and 722) are respectively disposed on the third side 483 and the fourth side 484 of the touch control area 48, wherein the third and fourth sides 483 and 484 are adjacent to each other. The lighting elements (721, 723, and 724) disposed on the second side 482 and the third side 483 illuminate the touch control area 48 to assist the formation of the real image of the object 45 and a virtual mirror image reflected by the first reflective element 711. In this embodiment, the first reflective element 711 occupies the whole first side. The second reflective element 712 is disposed on the middle region of the second side 482. The second lighting element 722 occupies only a portion of the fourth side 484, and is disposed close to an edge of the fourth side 484 adjacent to the first side 481. When the object 45 is close to the corner between the first side 481 and the fourth side 484 such that the real image of the object 45 and the mirror image reflected by the first reflective element 711 overlap each other, the second reflective element 712 reflects the object 45 to generate another mirror image which can be utilized to obtain the coordinates of the object 45.

The second reflective element 712 is for taking care of the upper-left blind zone, so it only has to occupy the middle portion of the second side 482, such that the coordinates of the object can be obtained from the mirror image reflected by the second reflective element 712 when the object 45 stays in the upper-left blind zone. The second lighting element 722 is optional, and it is used to enhance the formation of the mirror image of the object 45 by the second reflective element 712. Preferably, the second lighting element 722 does not extend to reach the image sensor 43, such that when the object 45 is close to the image sensor 43, there is not too much light directly reflected by the surface of the object 45 toward the image sensor 43 to affect the picture captured by the image sensor 43. The lengths of the second reflective element 712 and the second reflective element 722 can be adjusted as desired, as long as they resolve or alleviate the problem of the upper-left blind zone.

Figure 8:
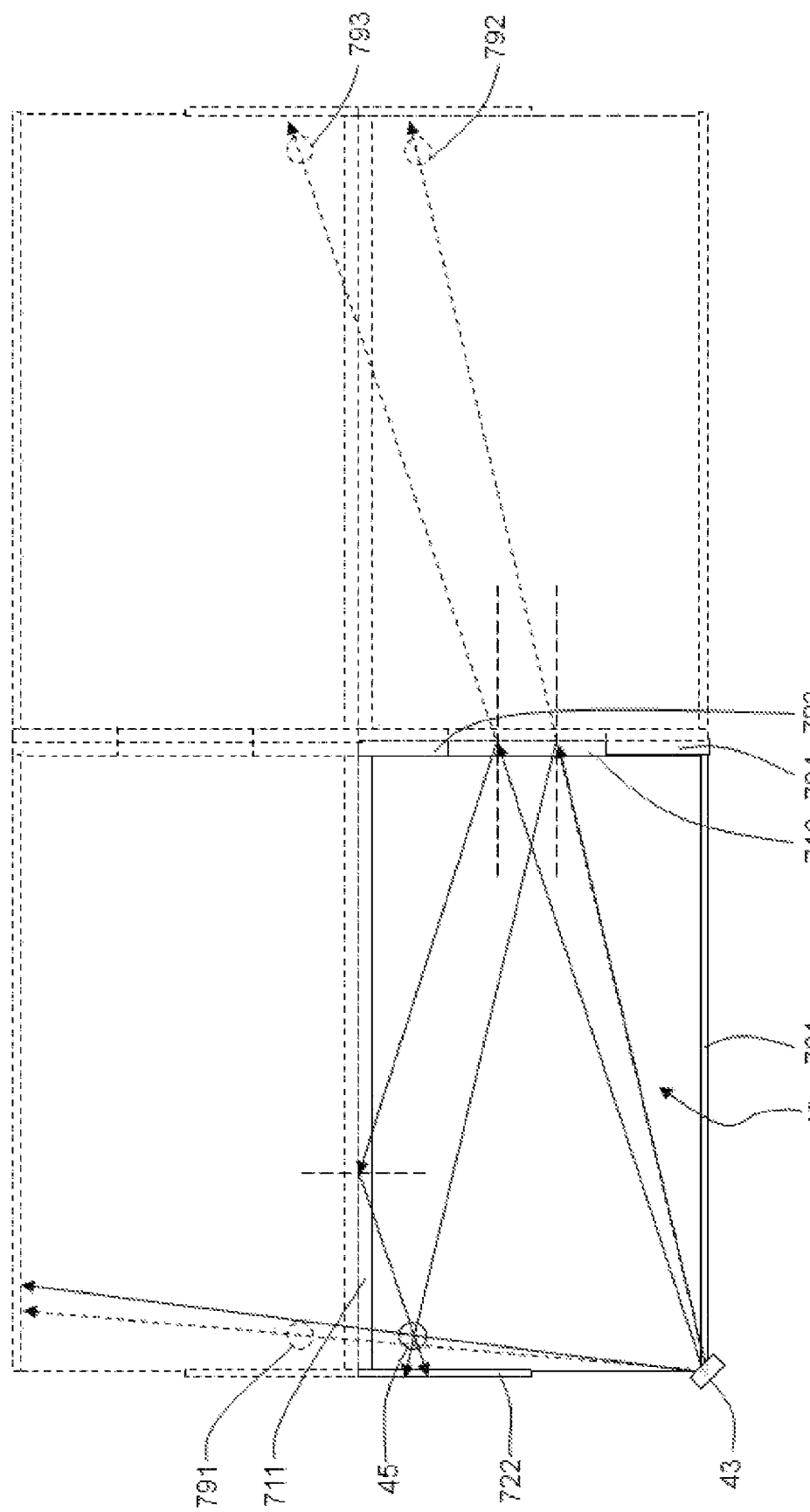
FIG. 8 shows that the optical touch panel system of FIG. 7 captures a picture through the sensing paths passing the object.
Figure 9:
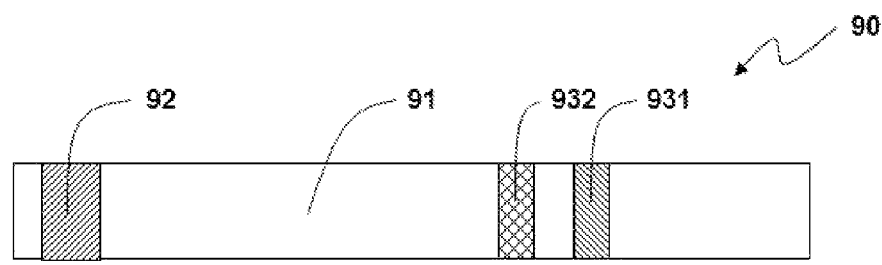
FIG. 9 shows a schematic diagram of the image-sensing window of the image sensor in FIG. 8.

FIG. 8 shows that the optical touch panel system of FIG. 7 captures a picture through the sensing paths passing the object. FIG. 9 shows a schematic diagram of the image-sensing window of the image sensor 43 in FIG. 8. The lighting elements (721, 722, 723 and 724) emit light to form a bright zone 91 with higher brightness in the image-sensing window 90 captured by the image sensor 43. When the object 45 is in or close to the neighborhood of the second lighting element 722, because the object 45 shields a portion of light emitted from the first lighting element 721 and reflected by the first reflective element 711, a narrow and dark overlapping image 92 of the object real image and a first mirror image 791 is formed in the image-sensing window 90, (that is, the projected object image and the first projected mirror image overlap with each other), as shown in FIG. 9. A second mirror image 792 is formed by reflecting the object 45 through the second reflective element 712, and a third mirror image 793 is formed by reflecting the second mirror image 792 through the first reflective element 711. The second projected mirror image 931 and the third projected mirror image 932 (the optical information of the second mirror image 792 and the third mirror image 793) are respectively formed on the image-sensing window 90 by the second mirror image 792 and the third mirror image 793.

When the second projected mirror image 931 and the third projected mirror image 932 are clear or carry sufficient optical information in comparison with the background bight zone 91, the coordinates of the object 45 can be obtained according to their geometric information such as the centers, gravity centers, or representative positions. However, as previously mentioned, the light path of the third projected mirror image 932 is long and the optical information may be unclear or insufficient. In this case, the geometric information of the overlapping image 92, such as the two sides or the border of the overlapping image 92, can be utilized to calculate the the coordinates of the object 45.

Figure 10:
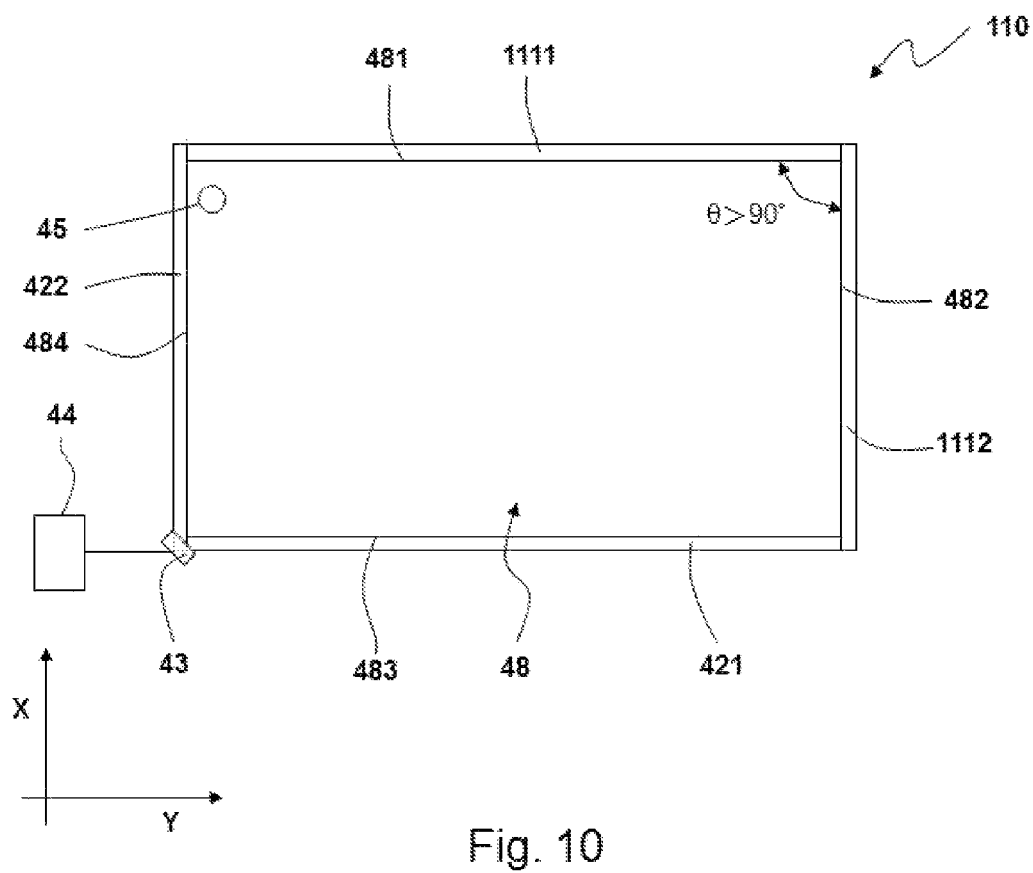
FIG. 10 shows a schematic diagram illustrating another embodiment of an optical touch panel system of the present invention.

FIG. 10 shows a schematic diagram illustrating another embodiment of an optical touch panel system of the present invention. The optical touch panel system 110 comprises first and second reflective elements (1111 and 1112), first and second lighting elements (421 and 422), an image sensor 43 and a processor 44. The first reflective element 1111 and the second reflective element 1112 are respectively disposed on the first side 481 and the second side 482 of the touch control area 48, wherein the first and second sides 481 and 482 are adjacent to each other. The first and second lighting elements (421 and 422) are respectively disposed on the third side 483 and the fourth side 484 of the touch control area 48, wherein the third and fourth sides 483 and 484 are adjacent to each other. The included angle between the first reflective element 1111 and the second reflective element 1112 maybe larger than 90° so as to resolve the problem of the infinite reflection; a preferred range is between 90° (not included) and 96° (included). In this embodiment, the coordinates of the object 45 can be calculated by a way similar to those described in the previous embodiments. The details are omitted here.

Figure 11:
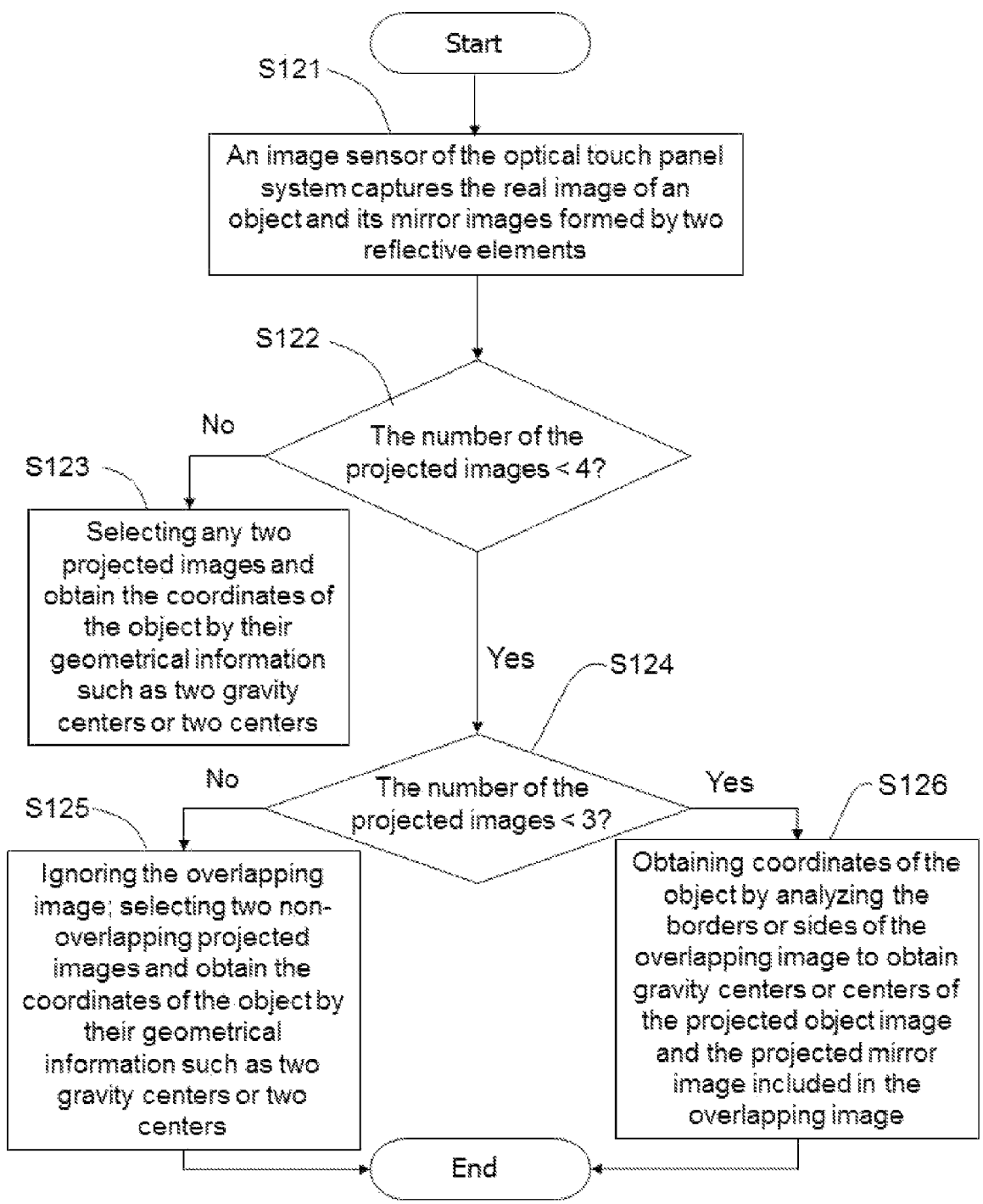
FIG. 11 shows a flow chart illustrating a positioning method of the optical touch panel system of the present invention.

FIG. 11 shows a flow chart illustrating a positioning method of the optical touch panel system of the present invention. In Step S121, the image sensor of the optical touch panel system captures the real image of the object and its plural mirror images formed by the two reflective elements. It is possible that the projected object image and a closest projected mirror image overlap in the image-sensing window, such as the overlapping image 92 in FIG. 9, but it is less likely for such overlapping image to occur in the embodiments in FIGS. 5 and 6. In the next Step 122, the system checks whether the number of the projected images (the total number of the projected object image and the projected mirror images) is smaller than 4, wherein an overlapping image counts 1. If the projected images overlap with one another or the optical information of a certain image is unclear, the number of the projected images maybe smaller than 4. If the number is equal to 4 (or larger), any two projected images can be selected, and the coordinates of the object are obtained by the geometric information of the two projected images, such as the gravity centers, centers, or the like, as shown in Step S123. If the number is smaller than 4, the system further checks whether the number of the projected images is smaller than 3, as shown in Step S124. If the number is equal to 3, the overlapping image is excluded and the two other isolated projected images are selected. The coordinates of the object are obtained by the geometric information of the two projected images, such as the gravity centers, centers, or the like, as shown in Step S125. If the number is smaller than 3, the overlapping image formed by the object image overlapping the mirror image is selected. The coordinates of the object are obtained according to the borders or sides of the overlapping image, as shown in Step S126, by analyzing the borders or sides of the overlapping image to obtain the gravity centers or centers of the projected object image and the projected mirror image included in the overlapping image.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, the positions and the number of the lighting elements can be different from the foregoing embodiments. For another example, two or more reflective elements can be provided on each of the first side and the second side as long as sufficient optical information can be obtained. Thus, the present invention should cover all such and other modifications and variations, which should be interpreted to fall within the scope of the following claims and their equivalents.

What is claimed is:

1. An optical touch panel system, for positioning an object in a touch control area, the system comprising:
    at least two reflective elements respectively disposed on a first side and a second side of the touch control area, wherein the first side and the second side are adjacent to each other, and wherein the sum of lengths of the first side and the second side is larger than the sum of lengths of the two reflective elements;
    two lighting elements respectively disposed on a third side and a fourth side of the touch control area, wherein the third side and the fourth side are adjacent to each other;
    two lighting elements respectively disposed at two ends of the second side, to emit light into the touch control area;
    an image sensor capturing an image of the object to form a projected object image and at least one mirror image of the object formed by the two reflective elements to form at least one projected mirror image; and
    a processor calculating coordinates of the object according to geometric information of at least two of the projected object image and the at least one projected mirror image;
    wherein the reflective element disposed on the second side occupies a middle portion of the second side and does not extend to the two ends of the second side, whereby a straight light path between the two lighting elements respectively disposed at two ends of the second side is blocked by the reflective element occupying the middle portion of the second side.

2. The optical touch panel system of claim 1, wherein the geometric information includes centers, gravity centers, representative positions, or borders of the projected object image and the projected mirror image.

3. The optical touch panel system of claim 1, wherein the reflective element disposed on the first side occupies the whole first side.

4. The optical touch panel system of claim 3, wherein the lighting element disposed on the fourth side occupies a portion of the fourth side, and is adjacent to the reflective element disposed on the first side.

5. The optical touch panel system of claim 1, wherein the processor selects any two of the projected object image and the at least one projected mirror image which are non-overlapping with any other or selects an overlapping image of the projected object image and the at least one projected mirror image according to the total number of the projected object image and the at least one projected mirror image, wherein an overlapping projected image counts one, and calculates the coordinates of the object according to the geometric information of the selected non-overlapping projected images or selected overlapping projected image.

6. A positioning method of an optical touch panel system, wherein an image sensor of the optical touch panel system forms projected images including a projected object image by capturing an image of an object in a touch control area and a plurality of projected mirror images by capturing a plurality of mirror images of the object formed by at least two reflective elements, the method comprising:
checking a total number of the projected images, wherein if any two of the projected object image and the projected mirror images overlap with each other, the overlapping projected image counts one;
selecting any two of the projected images and obtaining coordinates of the object according to geometric information of the two selected projected images if the number is larger than or equal to 4;
selecting two of the projected images which are non-overlapping with any other and obtaining coordinates of the object according to geometric information of the two selected projected images if the number is equal to 3; and
selecting the overlapping projected image formed by the projected object image overlapping with one or more projected mirror images and obtaining coordinates of the object according to borders or sides of the overlapping projected image if the number is smaller than 3;
wherein one of the reflective elements is disposed on one side of the touch control area to occupy a middle portion of the one side and does not extend to two ends of the one side, and two lighting elements respectively disposed at two ends of the one side, wherein a straight light path between the two lighting elements is blocked by the reflective element occupying the middle portion of the one side.

7. The positioning method of an optical touch panel system of claim 6, wherein the two reflective elements are respectively disposed on two adjacent sides of the touch control area and the sum of lengths of the two sides is larger than the sum of lengths of the two reflective elements.

8. The positioning method of an optical touch panel system of claim 7, wherein an included angle between the two reflective elements is larger than 90°.

9. The positioning method of an optical touch panel system of claim 6, wherein the geometric information includes centers, gravity centers, or representative positions of the projected images.

10. The positioning method of an optical touch panel system of claim 6, wherein the brightness of the projected images is smaller than the brightness of a background in an image-sensing window of the image sensor.

11. An optical touch panel system, for positioning an object in a touch control area, comprising:
at least two reflective elements respectively disposed on a first side and a second side of the touch control area, wherein the first side and the second side are adjacent to each other, and wherein an included angle between the two reflective elements is larger than 90°;
two lighting elements respectively disposed on a third side and a fourth side of the touch control area, wherein the third side and the fourth side are adjacent to each other;
two lighting elements respectively disposed at two ends of the second side, to emit light into the touch control area;
an image sensor capturing an image of the object to form a projected object image and at least one mirror image of the object formed by the at least two reflective elements to form at least one projected mirror image; and
a processor calculating the coordinates of the object according to geometric information of at least two of the projected object image and the at least one projected mirror image;
wherein the reflective element disposed on the second side occupies a middle portion of the second side and does not extend to the two ends of the second side, whereby a straight light path between the two lighting elements respectively disposed at two ends of the second side is blocked by the reflective element occupying the middle portion of the second side.

12. The optical touch panel system of claim 11, wherein the geometric information includes centers, gravity centers, representative positions, or borders of the object image and the mirror image.

13. The optical touch panel system of claim 11, wherein the processor selects any two of the projected object image and the at least one projected mirror image which are non-overlapping with any other or selects an overlapping image of the projected object image and the at least one projected mirror image according to the total number of the projected object image and the at least one projected mirror image, wherein an overlapping projected image counts one, and calculates the coordinates of the object according to the geometric information of the selected non-overlapping projected images or selected overlapping projected image.

14. An optical apparatus of an optical touch panel system, for positioning an object in a touch control area, comprising:
a first reflective element disposed on a first side of the touch control area;
a second reflective element disposed on a second side of the touch control area and occupies a middle portion thereof, wherein the first side and the second side are adjacent to each other;
a first lighting element disposed on a third side of the touch control area;
a second lighting element disposed on a fourth side of the touch control area and adjacent to the first side, wherein the third side and the fourth side are adjacent to each other; and a third lighting element and a fourth lighting element disposed on the second side, wherein the fourth and third lighting elements are respectively adjacent to the first side and the third side;

wherein the second reflective element is between the fourth and third lighting elements and does not extend to two ends of the second side, whereby a straight light path between the fourth and third lighting elements is blocked by the second reflective element in between.

15. An optical touch panel system, for positioning an object in a touch control area, the touch control area including a first side, a second side, a third side, and fourth side adjacent to each other in the listed order, the system comprising:

an image sensor disposed at the corner between the third side and the fourth side;

a lighting unit disposed on the fourth side and occupies a portion thereof which is adjacent to the first side;

a reflective unit disposed on the second side and occupies a middle portion thereof; and a first assistant lighting element and a second assistant lighting element respectively disposed at the two ends of the second side, to emit light into the touch control area;

wherein the image sensor captures a mirror image formed by the reflective unit reflecting light from the lighting unit and the reflective unit does not extend to two ends of the second side, whereby a straight light path between the first assistant lighting element and the second assistant lighting element is blocked by the reflective unit occupying the middle portion of the second side.

16. The optical touch panel system of claim 15, further comprising:

a reflective element disposed on the first side; and a lighting element disposed on the third side.

* * * * *